United States Patent [19]

Woods

[11] Patent Number: 5,039,833

[45] Date of Patent: Aug. 13, 1991

[54] MICROWAVE HEATABLE MATERIALS

[75] Inventor: Kenneth D. Woods, Long Lee, England

[73] Assignee: Waddingtons Cartons Limited, Leeds, England

[21] Appl. No.: 302,707

[22] Filed: Jan. 26, 1989

[30] Foreign Application Priority Data

Feb. 3, 1988 [GB] United Kingdom ............... 8802417
Feb. 3, 1988 [GB] United Kingdom ............... 8802418

[51] Int. Cl.⁵ .............................................. H05B 6/80
[52] U.S. Cl. ...................... 219/10.55 E; 219/10.55 F; 426/107; 426/234; 426/243; 99/DIG. 14
[58] Field of Search ............... 219/10.55 E, 10.55 F, 219/10.55 M; 426/107, 113, 241, 234, 243; 99/DIG.14; 126/390; 428/34.1, 35.8, 35.9

[56] References Cited

U.S. PATENT DOCUMENTS

| | | | |
|---|---|---|---|
| 4,190,757 | 2/1980 | Turpin et al. | 219/10.55 E |
| 4,230,924 | 10/1980 | Brastad et al. | 219/10.55 E |
| 4,656,325 | 4/1987 | Keefer | 219/10.55 E |
| 4,676,857 | 6/1987 | Scharr et al. | 426/107 X |
| 4,713,510 | 12/1987 | Quick et al. | 219/10.55 E |
| 4,777,053 | 10/1988 | Tobelmann et al. | 426/107 |
| 4,814,568 | 3/1989 | Keefer | 219/10.55 E |
| 4,865,921 | 9/1989 | Hollenberg et al. | 219/10.55 E |
| 4,883,936 | 11/1989 | Maynard et al. | 219/10.55 E |
| 4,908,246 | 3/1990 | Fredricks et al. | 428/34.1 |

Primary Examiner—Philip H. Leung
Attorney, Agent, or Firm—Klauber & Jackson

[57] ABSTRACT

The invention provides that receptor material sheet is so formed or treated as to vary the microwave heating characteristics thereof. In one arrangement, the microwave heating characteristic is varied by corrugating the receptor material, while in another case the sheet material is embossed or treated so as to break up the receptor layer. In preferred arrangements the above two features are embodied in the same material, and according to a further preferred feature the receptor materials are embodied in packages for foodstuffs to be microwave cooked.

3 Claims, 3 Drawing Sheets

MICROWAVE HEATABLE MATERIALS

This invention relates to microwave heatable materials, and in particular concerns what are known as receptor materials, being materials in sheet form which comprise and more usually contain a layer of metallic particles of such thinness that when the material is subjected to microwave radiation, for example in a microwave oven, the metallic layer heats up to a high temperature, for example in the order of 200° C. so that if foodstuff to be cooked is placed in contact therewith, the surface of same can be browned or crisped giving the foodstuff a more conventional cooked appearance as compared to simply cooking the foodstuff in a microwave oven without the use of receptor materials.

Examples of receptor materials of the type to which the invention relates are disclosed in British patent specification No. 2046060 and European patent application No. 88100112.7.

Whilst the use of these receptor materials has been generally satisfactory, and the demand for such materials is considerable, further development is needed to exercise a finer control on the utilisation of the materials in microwave cooking.

For example in some cases it may be desirable to control the heating effect of the receptor film by simply reducing same, or by allowing only portions of the material to heat up to the maximum extent. Thus, in some known arrangements, sheets of receptor material which have to be connected to produce trays, platform sleeves or other constructions, require the receptor sheets to be joined together by gluing or by a locking arrangement, and this invariably produces multiple layers of receptor sheet, and in the region where the sheets overlap because there are two layers of the metallic particles, there can be a local overheating. This can lead to the creation of odours, and possible tainting of the foodstuff which is being cooked.

Also when a sheet of receptor material is produced, it may not be of the correct shape for the food product to be cooked thereon, and there may be edge areas of the sheet which do not contact the foodstuff. These areas tend to overheat during the cooking process and again this can lead to the production of odour and tainting of the food. These areas can in fact scorch.

Furthermore, when it is desired to produce a patterned effect on cooked foodstuff, for example the creation of "bars" across steaks or hamburgers or beefburgers or the like, this would normally require the provision of strips of receptor material to be laid down, or for the receptor material to be made of a number of layers in those regions where the bars were to be created.

Again, a difficulty arises when the use of a receptor material is envisaged for heating different types of foodstuff in the same package and whether the different types of foodstuff have to be heated to different degrees. Receptor materials of different response characteristics would have to be employed or extra layers of metallic film would have to be applied in the different areas of the receptor material.

Again, some foodstuffs require only to be heated generally and not to a crisped or browned state but heated sufficient so that the foodstuff does not become soggy as can happen for example with bread buns and the like when they are heated in a microwave oven.

Control of all of these requirements can be effected by a first aspect of the present invention which provides that a receptor material sheet is treated so as to upset the metallic layer whereby its heating performance in the absorption of microwave energy is reduced.

More specifically, the sheet material may be subjected to an embossing effect or ultrasonic treatment which, it is believed, breaks up the metallic layer, and the breakage of the metallic layer prevents the flow of induced currents within the layer, and thereby reduces the heating effect.

The embossing or upsetting may be performed by any suitable mechanical pressing means, and when the effect of the embossing is appreciated, it is to be pointed out that a number of highly desirable effects can be produced from this realisation. Thus, the embossing can be used in the case where receptor layers overlap, the embossing being applied at the overlap area to reduce the otherwise higher heating effect in the overlap area so as to make it equal to the other areas of the receptor sheets.

In the case where a receptor sheet is produced for a particular product say a circular pizza pie, if the receptor material is square, those portions which overhang the edge of the pizza pie can be embossed leaving only a circular area of unbroken metallic film in register with the pizza pie so that when the whole assembly is placed in a microwave oven and microwave energy is applied, then the circular area under the pizza will heat up to a much greater degree than the surrounding embossed area. The surrounding embossed area will therefore not scorch or overheat and problems of tainting the foodstuff can be avoided but nevertheless the continuous receptor film under the pie will heat to the normal extent and will crisp or brown the underside of the pie to produce a satisfactory cooked product.

When it is required to apply a patterned browning or crisping effect to foodstuff, then the receptor material can be embossed in an appropriate pattern leaving only unembossed regions which will heat up to a greater extent, and will provide the patterned effect on the product.

When it is desired to use this aspect of the invention to differentially heat different foodstuffs in the same package, then the respective parts of the receptor material in contact with the respective foodstuffs can have different heating characteristics simply by embossing one part to the required degree, and placing the foodstuffs in contact with the respective parts of the receptor material.

When a receptor material is to be used simply for general heating of a product without browning or crisping same, and if its normal microwave heating characteristic is too high, the material may simply be embossed to reduce its heating characteristic. This preferred feature of the first aspect of the invention is particularly suitable in the case where the receptor material is to heat for example bread products which might otherwise become soggy when subjected only to microwave heating.

The embossing may be carried out by any suitable mechanical means and the extent to which the material is embossed will control the reduction in the heating effect which is achieved by the embossing.

In accordance with a modified form of the first aspect of the present invention, instead of or in addition to the said embossing, the receptor sheet is subjected to ultrasonic heating in those areas where the microwave heating effect is to be reduced. It has been found that applying ultrasonic energy to such areas of the receptor material effects a reduction of microwave density in said areas. All of the above features described in relation to the embossing can be adopted in relation to the alternative treatment and generally speaking the same advantages are obtained. The ultrasonic heating tool can be of the same shape as the embossing tool, and obviously ultrasonic heating and embossing can be effected at the same time.

Where the receptor sheet comprises two layers of plastic film with the metallic particles therebetween, the ultrasonic heating can be used to weld the layers together, but the invention is not to be considered as being limited to ultrasonic welding, because for example, it is quite usual for the receptor to comprise a base of cardboard or the like to which a plastic film, carrying metallic particles, is laminated.

As can be appreciated, the first aspect of the invention has extremely wide application but furthermore it provides advantages in manufacturing. Thus, it is relatively simple to produce square sheets of receptor material, but the production of circular sheets of receptor material adds an additional manufacturing operation involving the punching of the circular portions from larger sheets. By utilising the first aspect of the invention, it is not necessary to punch circular sections from the sheets but rather the highlighting of the circular section can be achieved by embossing or ultrasonically heating around the circular area leaving the circular area having the high heating characteristic whilst the embossed or ultrasonically treated area has the reduced heating characteristic or, if the embossing or ultrasonic treatment is carried out to a conclusive extent, then the heating characteristic of the treated area may well be completely destroyed.

Another aspect of the invention also provides for variation in heating characteristic of receptor material. Thus, in known arrangements, when the receptor material is a flat sheet, and lies between the foodstuff and a supporting base of the microwave oven, upon heating up of the receptor material, the base can act as a heat sink extracting heat from the receptor material, and thereby exercising a limiting effect on the efficiency of the receptor material in performing its function. Also, it can sometimes be required that the receptor should provide more space heat for the food product being cooked, as opposed to providing a surface which effects a crisping or browning effect on the food, and the utilisation of a receptor sheet which contacts all of the foodstuff surface may not provide the desired effect.

In a second aspect therefore, the present invention seeks to provide a receptor material which can be used as part of a foodstuff package, or for use in a foodstuff package, or simply as a support for foodstuff whilst being cooked in a microwave oven, which material provides certain advantageous effects as set forth hereinafter.

In accordance with a second aspect of the invention, a receptor material is in corrugated form.

By this arrangement, the metallic film will follow the corrugation shape and therefore for a given area which is covered by the receptor material according to the invention, a greater metallic layer will be provided than would be the case where the receptor material is in the form of a flat sheet. More specifically, the amount of receptor material film will be greater than it would be in a flat sheet of the same size.

The utilisation of a corrugated receptor material in accordance with the second aspect of the invention provides a number of advantages as follows:

As the material is corrugated, the majority of the receptor material is kept out of contact with the microwave oven support, and therefore this support is insulated to a certain extent from the metallic layer minimising the heat sink effects, which would otherwise reduce the effectiveness of the receptor.

By the same reasoning, the corrugations keep the food from being in continuous surface contact with the receptor material, and therefore there are air gaps through which for example moisture can escape. It is to be noted that by varying the size of the height and pitch of the corrugations the air gaps can be controlled to balance the venting and temperature at the surface of the food. Thereby, optimum control of the cooking of the food can be achieved.

Within a given projected area of the corrugated material, there will be more heatable metallic material compared to a flat sheet of receptor material, and therefore the corrugated material will absorb more of the microwave radiation and will in turn produce a greater heating effect. The crests of the corrugations can be used to give a cooked pattern on the foodstuff.

The corrugated materials are suitable for use in connection with a package containing frozen chipped potatoes, with the corrugated material being in the base of the package. By this means, as compared to the utilisation, as is conventional, of a flat sheet of receptor material in the base, greater energy can be released by the larger area of receptor material whereby a higher temperature is produced inside the package, and therefore the resulting chipped potatoes are crisper and more palatable. Since the chipped potatoes cannot lie flat on the receptor surface, due to the corrugations, they do not become over-cooked or over-browned on their sides, and throughout the chipped potatoes are more evenly cooked and crisped.

In a modified form of the second aspect of the invention, the corrugated material can be formed into a sleeve inside of which the food product to be cooked is located. Such an arrangement enables more even cooking around the product, and also allows for example grease or other products which become liquid during cooking of the foodstuff to run away along the corrugation grooves.

The material may comprise a corrugated sheet and a flat sheet applied to one side of the corrugated sheet, the flat sheet being a material such as paper or cardboard. The corrugated material may comprise paper material with, on one side thereof, the metallic layer of receptor material. This metallic layer may be covered by a protective film being of polyester plastics material or the like.

The first and second aspects of the invention may be combined in the same receptor material sheet.

Embodiments of the aspects of the invention are illustrated in the accompanying drawings, to which reference is now made.

Figure 1:
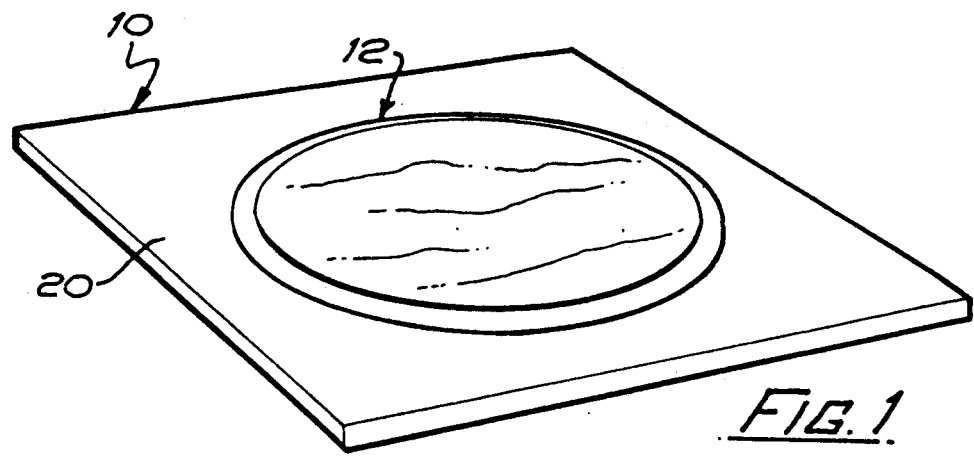
FIG. 1 shows a sheet of receptor material on which is supported a pizza pie for the cooking of same by microwave energy.

Referring to the drawings and firstly to FIGS. 1 to 4, in FIG. 1 is shown a square sheet 10 of receptor material for use in the cooking of a pizza pie 12 which rests on the material 10 centrally thereof. In normal use, the assembly shown in FIG. 1 would be placed in a microwave oven, and the assembly subjected to microwave radiation. This has the effect not only of cooking the pizza pie 12, but also of heating up the surface of the sheet 10, which is of receptor material, to a high degree so that the underside of the pizza pie 12 will be crisped or browned to give it a more realistic appearance of having been cooked in a conventional oven. If the receptor sheet 10 is not provided, whilst the pizza 10 will heat under microwave action, it will be relatively soft and soggy and less appetising.

Figure 2:
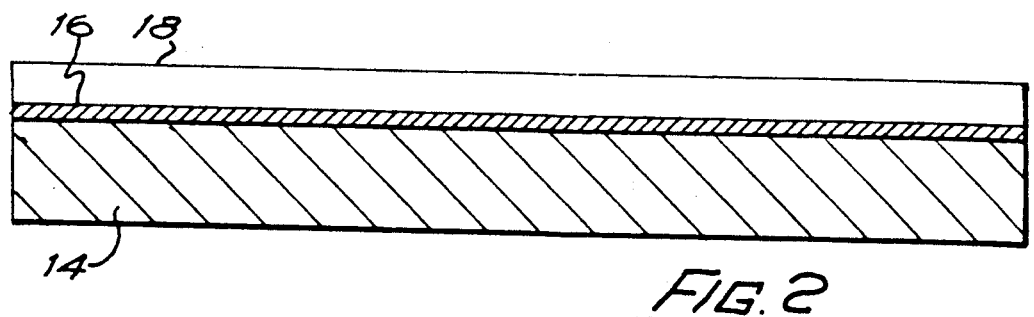
FIG. 2 shows a section of the receptor material shown in FIG. 1.

The receptor material 10 is of the construction shown in FIG. 2 (which is to a much enlarged scale) and comprises a base board 14, a thin metallic layer 16 and a covering film 18. The extremely thin metallic layer 16 and covering 18 may be as described in said British Patent and also in European application No. 88100112.7.

As is now known, when the receptor material of FIG. 2 is subjected to microwave radiation, the layer 16 heats up to a high temperature sufficient to crisp or brown the underside of the pizza pie 12. However, in microwave cooking of the assembly shown in FIG. 1, unless great care is exercised, it is possible for the surrounding area 20 of the sheet 10 to overheat. This area is not in contact with any article such as the pie 12 forming a heat sink. When the area 10 overheats, it tends to scorch and will give off odours which can taint the foodstuff 12 and this is undesirable.

Figure 3:
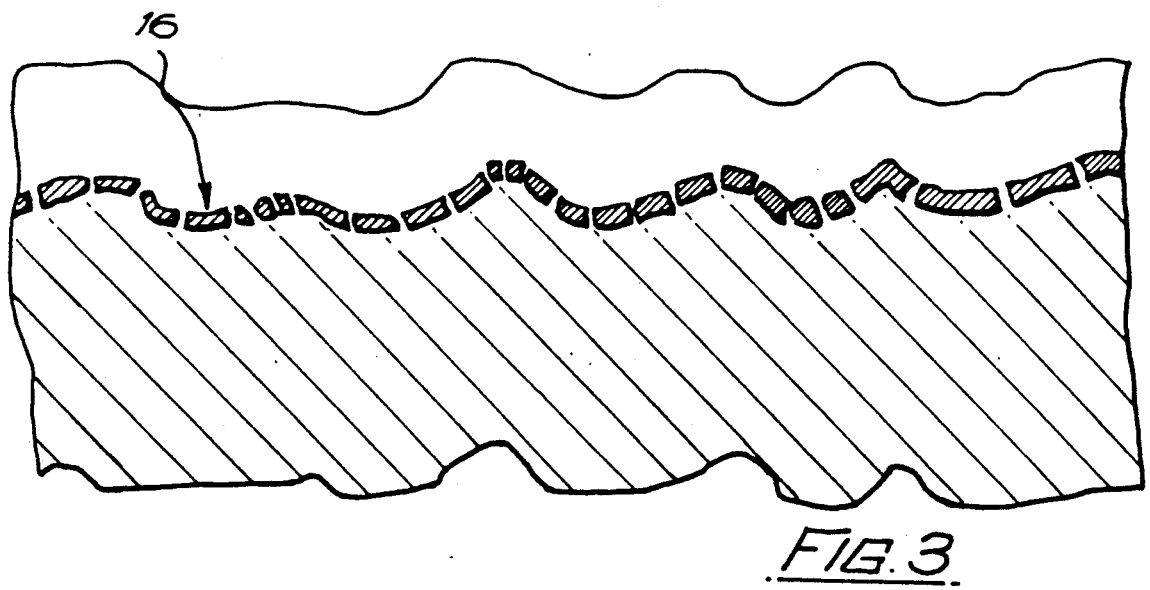
FIG. 3 shows the receptor material of FIG. 2 to enlarged scale, after the material has been embossed or ultrasonically heated.
Figure 4:
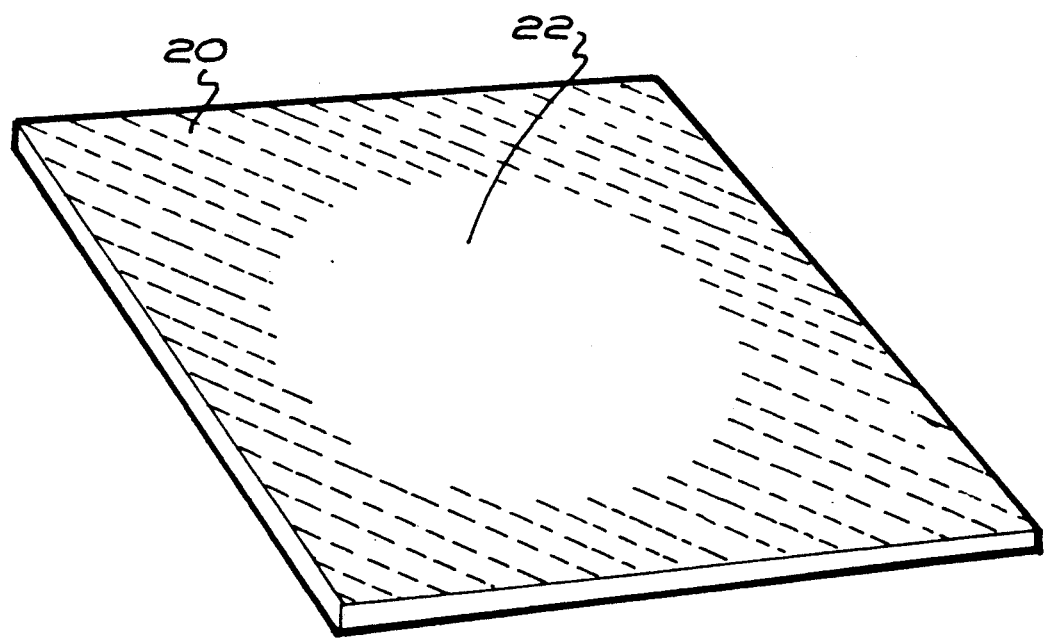
FIG. 4 shows the sheet of FIG. 1 but duly embossed or ultrasonicaly treated to make it suitable for use in the cooking of the pizza pie shown in FIG. 1.

The present invention in its first aspect exercises a control on this overheating and provides that the sheet 10 is in fact upset mechanically or ultrasonically. In particular the sheet may be upset by being embossed so as to break up the layer 16 in fact as shown in FIG. 3. FIG. 3 shows that the sheet 10 has been deformed by an embossing process. The embossing shown is somewhat irregular, and the illustrated breakage of the film 16 is to give an indication of what is believed happens to the film 16 although it has not been possible to examine what form the breaks take in the layer 16. The embossing and the breakage of the layer 16 means that where it is embossed, the sheet 10 will not heat up to the same extent as where it has not been embossed and thereby areas of differential heating are created in the sheet 10. FIG. 4 shows how the sheet 10 might suitably be embossed for the heating of the pizza pie 12 and it will be seen that a circular area 22 is left for receiving the pie 12 and the surrounding embossed area 20 will have a lesser heating characteristic. If the pie is heated when positioned on the sheet as shown in FIG. 4, and in register with the area 22, then scorching of the surrounding area 20 is avoided by the embossing. Therefore tainting of the foodstuff is avoided.

By using an embossing technique, the many modifications and variations as explained herein can be adopted, and it is envisaged that the selection of the embossing can have wider uses. It is possible also to emboss the sheet 10 over its entire surface when the sheet is to be used for example for the heating of materials such as bread products which do not have to be provided with a cooked surface, but must be kept crisp during the heating process.

As an alternative to, or to augment, the embossing technique, the receptor material may be upset by being subjected to ultrasonic heating in those areas where the microwave heating effect is to be reduced. It has been found that applying ultrasonic energy to such areas of the receptor material effects a reduction of microwave density in said areas. All of the above features described in relation to the embossing can be adopted in relation to the alternative treatment and generally speaking the same advantages are obtained. The ultrasonic heating tool can be of the same shape as the embossing tool, and obviously ultrasonic heating and embossing can be effected at the same time.

Where the receptor sheet comprises two layers of plastic film with the metallic particles therebetween, the ultrasonic heating can be used to weld the layers together, but the invention is not to be considered as being limited to ultrasonic welding, because for example, it is quite usual for the receptor to comprise a base of cardboard or the like to which a plastic film, carrying metallic particles, is laminated.

The present invention in its first aspect therefore provides a highly desirable step forward in the field of utilisation of receptor films in microwave cooking.

The material of the first aspect of the invention has been illustrated in the embodiment as being a sheet, but it could in fact be a wrapping or part of a package or an insert for a package in which foodstuff is contained.

Figure 5:
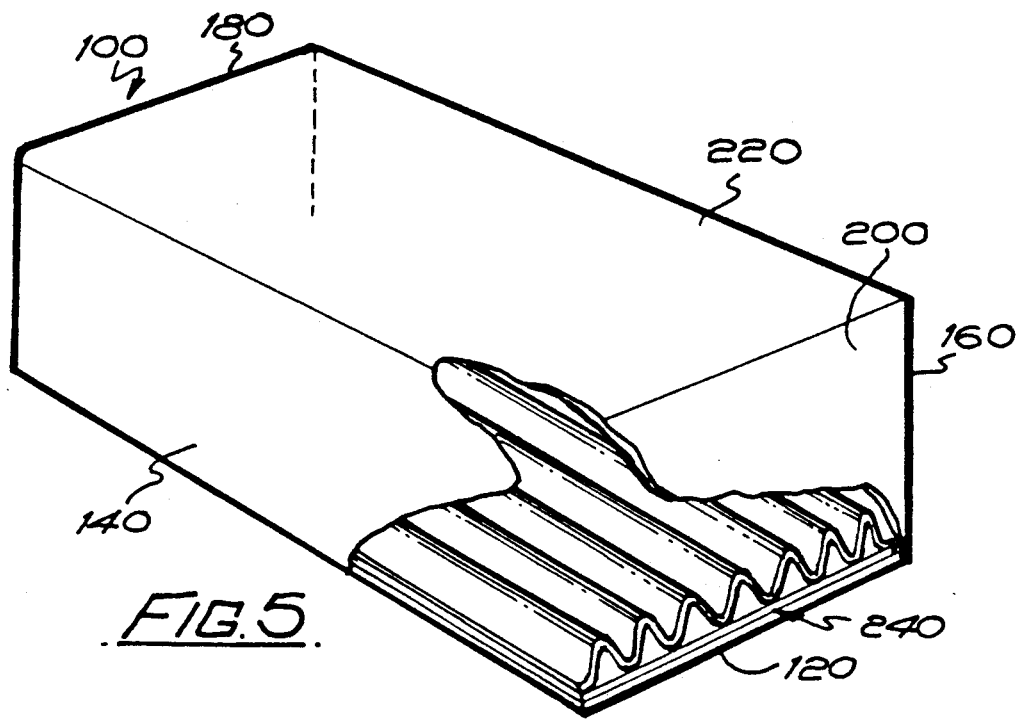
FIG. 5 is a perspective view of a rectilinear box for holding for example frozen chipped potatoes.
Figure 6:
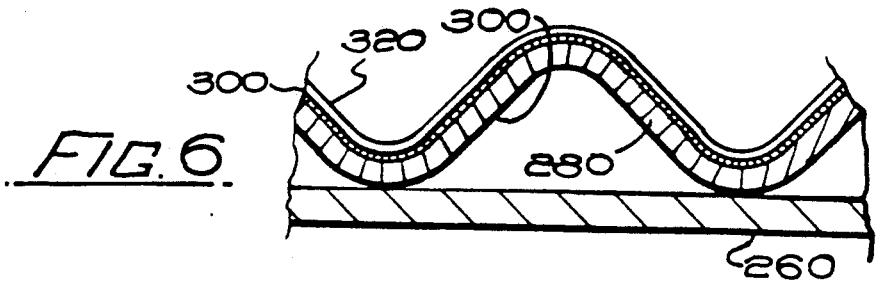
FIG. 6 is a detailed sectional elevation showing the corrugated material used in the box of FIG. 5.
Figure 7:
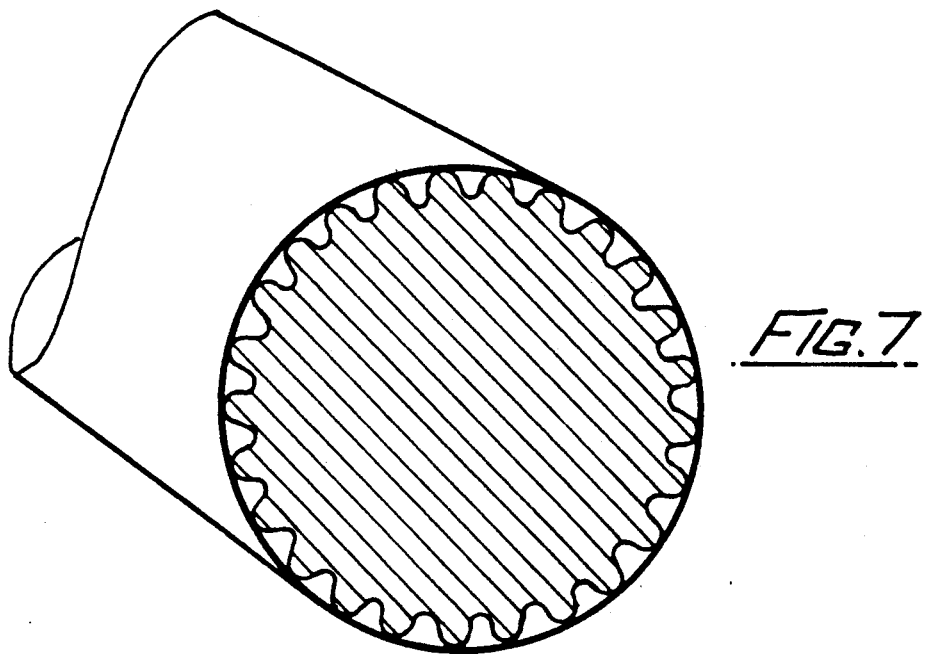
FIG. 7 shows corrugated material similar to FIG. 6 formed into a sleeve for holding foodstuff to be cooked.

The method of constructing the receptor layer 16 may be as described in said British Patent or said European Patent Application. Additionally, instead of being metallic particles, the layer 16 could be a continuous metallic foil. Referring now to FIGS. 5 to 7 which shows another aspect of the invention, a rectilinear box 100 shown in FIG. 5 is constructed of cardboard or the like material, and has a base 120, sides 140, 160, ends 180 and 200, and a top 220 which can be opened and closed to gain access to the contents. Inside the box and resting on the base is a receptor material insert 240 of the same shape and projected area as the base 120 but the insert 40 as shown in FIG. 6 (which is to an enlarged scale) comprises a support sheet 260 of cardboard or the like material, and a corrugated sheet 280 of similar material. On the upper surface of the corrugated sheet 280 is applied the receptor material being in the form of a layer 300 of metallic particles applied and constructed as disclosed in said British Pat. No. 2046060 or said European patent application No. 88100112.7. The metallic layer 300 is covered by a protective film 320 of polyester film or the like material. In accordance with the said British Patent, the metallic layer 300 is preferably deposited by vacuum deposition on the film 320, and the film 320 and layer 300 may then be laminated to the sheet 280 and finally the laminated sheet is corrugated into the form shown and applied to the sheet 260 by any conventional means. Part or all of the sheet may be embossed in accordance with the first aspects of the present invention as described herein.

In use, the package 100 contains typically chipped potatoes or any other material to be cooked in a microwave oven, and the package is simply placed in the microwave oven on the support tray thereof, and the microwave energy applied to the package. This has the effect as explained in said prior patent and European patent specification of causing the layer 300 quickly to heat up to a relatively high temperature. The heat released by the heating up of the layer effects a cooking and a crisping of the chipped potatoes, but because the chips will rest only in contact with the crests of the corrugations, then there will be no over crisping or browning of the lower chips but rather the heat will be released into the entire package raising the temperature of same and effecting a more even and better cooking of the chipped potatoes rather than in the case when the receptor layer 300 is simply a flat sheet in the base of a package.

Instead of the corrugations forming an insert to the package, they could be formed as an integral part of the package.

In the arrangement of FIG. 7, the corrugated material is formed into a sleeve for containing the foodstuff, and this arrangement applies when it is required to create an even but high temperature all around the foodstuff, and this embodiment also is of considerable advantage when it is required to provide channels to allow grease or the like to run clear of the foodstuff during the cooking. The sleeve shown in FIG. 7 is circular, but it may be of another shape such as rectangular, square or oval.

We claim:

1. A microwave heatable sheet for cooking food stuff comprising:

a) a base layer;

b) a microwave receptor material layer which is attached to and extends over an area of said base layer and which heats up in the presence of microwave energy, said microwave receptor material layer having at least one selected mechanically embossed region in said area which is formed into small pieces to reduce the heating characteristic such that the base layer remains structurally intact, said at least one selected region defining a sub-area less than said area and having a different heating characteristic in comparison with the remainder of said area.

2. A sheet according to claim 1, wherein said at least one selected region includes another layer of said receptor material to increase the heating characteristic of said region compared to the remainder of the area.

3. A package for holding products to be cooked by microwave cooking, said package being formed from a microwave heatable sheet for cooking food stuff comprising:

a) a base layer;

b) a microwave receptor material layer which is attached to and extends over an area of said base layer and which heats up in the presence of microwave energy, said microwave receptor material layer having at least one selected mechanically embossed region in said area which is formed into small pieces to reduce the heating characteristic such that the base layer remains structurally intact, said at least one selected region defining a sub-area less than said area and having a different heating characteristic in comparison with the remainder of said area.

* * * * *